(12) United States Patent
Hermsen

(10) Patent No.: US 7,606,458 B2
(45) Date of Patent: Oct. 20, 2009

(54) MOVABLE OPTICAL FIBER CONNECTION SYSTEM AND OPTICAL FIBER BEND LIMITING DEVICE FOR USE THEREIN

(75) Inventor: Eric Hermsen, Wall, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 12/035,167

(22) Filed: Feb. 21, 2008

(65) Prior Publication Data
US 2009/0214172 A1    Aug. 27, 2009

(51) Int. Cl.
G02B 6/00    (2006.01)
G02B 6/36    (2006.01)

(52) U.S. Cl. .......................................... 385/135; 385/86
(58) Field of Classification Search ................. 385/135, 385/86
See application file for complete search history.

(56) References Cited

U.S. PATENT DOCUMENTS

| | | | | |
|---|---|---|---|---|
| 4,595,255 A | * | 6/1986 | Bhatt et al. | 385/135 |
| 4,630,476 A | * | 12/1986 | Moore | 73/293 |
| 4,714,343 A | * | 12/1987 | Ide | 356/73.1 |
| 5,066,149 A | * | 11/1991 | Wheeler et al. | 385/135 |
| 5,067,784 A | * | 11/1991 | Debortoli et al. | 385/53 |
| 5,647,045 A | * | 7/1997 | Robinson et al. | 385/135 |
| 5,781,672 A | * | 7/1998 | Cutts | 385/22 |
| 5,781,686 A | * | 7/1998 | Robinson et al. | 385/135 |
| 6,442,322 B1 | | 8/2002 | Chen et al. | |
| 6,968,097 B2 | * | 11/2005 | Arima et al. | 385/14 |
| 2004/0033005 A1 | * | 2/2004 | Arima et al. | 385/14 |
| 2005/0175293 A1 | * | 8/2005 | Byers et al. | 385/88 |
| 2007/0206780 A1 | * | 9/2007 | Kerry et al. | 379/413.02 |

* cited by examiner

Primary Examiner—K. Cyrus Kianni
(74) Attorney, Agent, or Firm—Grossman, Tucker, Perreault & Pfleger, PLLC

(57) ABSTRACT

An optical fiber bend limiting device may be used in a movable optical connection system to transition optical fibers between at least first and second optical fiber connecting structures that move relative to each other. The optical fiber bend limiting device may be coupled between the optical fiber connecting structures such that the bend limiting device moves with the connecting structures. The optical fiber bend limiting device allows movement of the optical fibers within the movable optical fiber connection system while preventing the optical fibers from bending beyond a bend radius limit.

10 Claims, 6 Drawing Sheets

MOVABLE OPTICAL FIBER CONNECTION SYSTEM AND OPTICAL FIBER BEND LIMITING DEVICE FOR USE THEREIN

TECHNICAL FIELD

The present invention relates to optical fiber management and more particularly, to movable optical fiber connection system and an optical fiber bend limiting device for transitioning the optical fiber between connecting structures.

BACKGROUND INFORMATION

Optical equipment often includes optical fibers coupled between different components. In some optical equipment, for example, optical fibers may be coupled between components on different circuit boards at different levels (e.g., between a mother board and a mezzanine board). In such a configuration, the optical fibers should be transitioned from one board to another board in a way that protects the optical fiber. When optical fibers are placed under tension or bent beyond a certain bend radius, the optical fibers may be damaged and the transmission of optical signals through the fibers may be adversely affected. Optical fiber storage trays may be used, for example, with the fibers coiled around the trays to prevent tension and excessive bending of the fibers.

In some cases, optical fibers may be coupled to circuit boards or other structures that are movable relative to each other. For example, optical fibers may be coupled at one end to a mother board and at another end to a removable circuit board (e.g., an optical interface board or optical circuit board) or pluggable module that moves relative to the mother board. In certain optical systems, for example, an optical board or module may be removed to clean the optical connectors coupled to the optical fibers, to add or replace components (e.g., PROM chips) on the optical board, and/or to repair the optical board or module.

To avoid damage to the optical fibers when the structures or components coupled to the fibers are moved, some systems use blind mate optical connector systems that disconnect sections of the optical fibers when the components are removed and reconnect the optical fibers when the components are reinserted. In these systems, however, disconnecting the optical fibers brings down the optical path and disrupts operation of the optical system. In other systems, the fiber may be "spooled" with enough slack to allow the pluggable component to be partially removed. In these systems, however, the excess fiber may be susceptible to damage.

BRIEF DESCRIPTION OF THE DRAWINGS

These and other features and advantages of the present invention will be better understood by reading the following detailed description, taken together with the drawings wherein.

DETAILED DESCRIPTION

An optical fiber bend limiting device may be used in a movable optical fiber connection system to transition optical fibers between at least first and second optical fiber connecting structures that move relative to each other. The optical fiber bend limiting device may be coupled between the optical fiber connecting structures such that the bend limiting device moves with the connecting structures. The optical fiber bend limiting device allows movement of the optical fibers within the movable optical fiber connection system while preventing the optical fibers from bending beyond a bend radius limit.

Figure 1A:
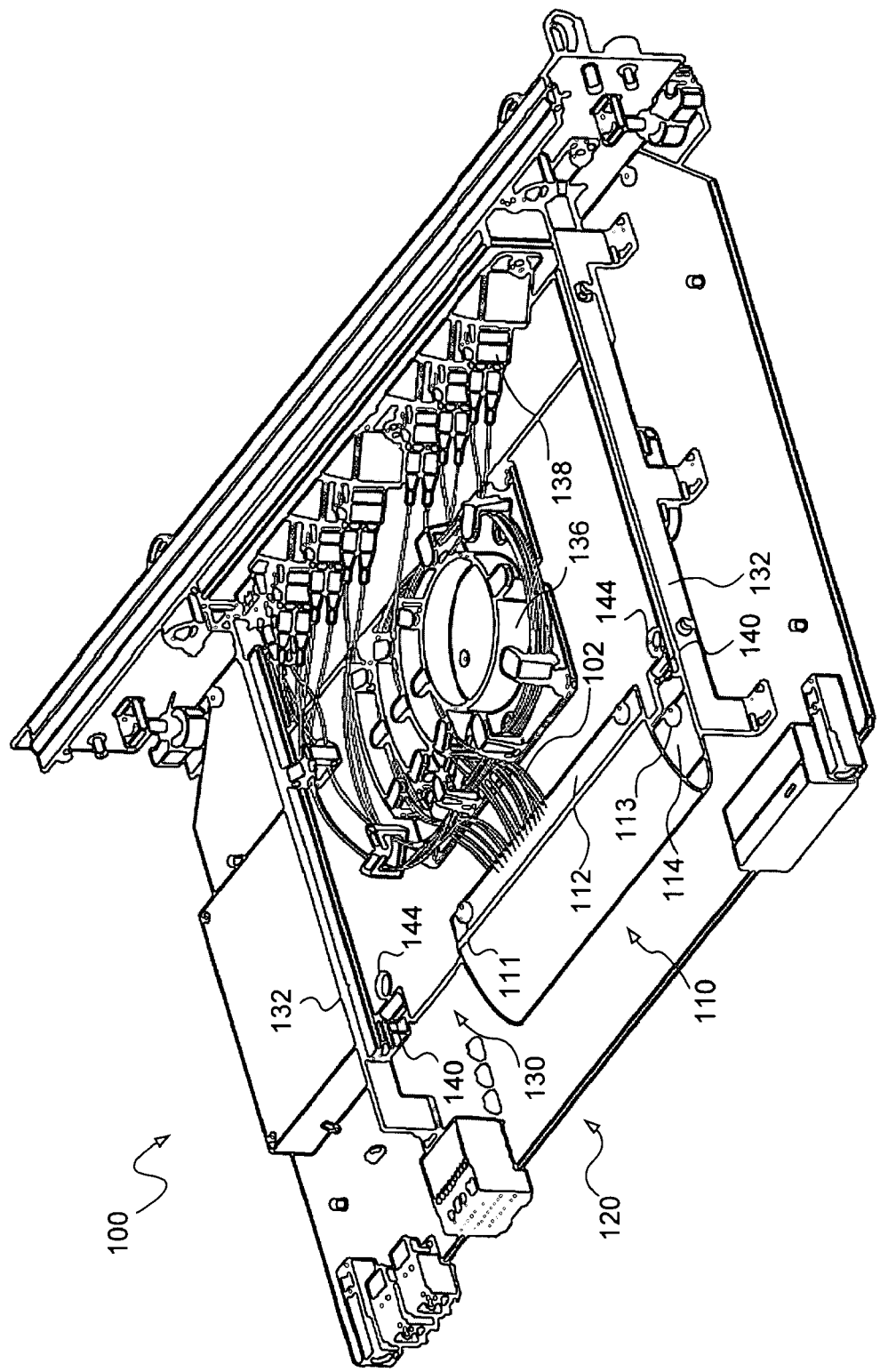
FIGS. 1A and 1B are perspective views of a movable optical fiber connection system in a retracted position and an expanded position, respectively.
Figure 1B:
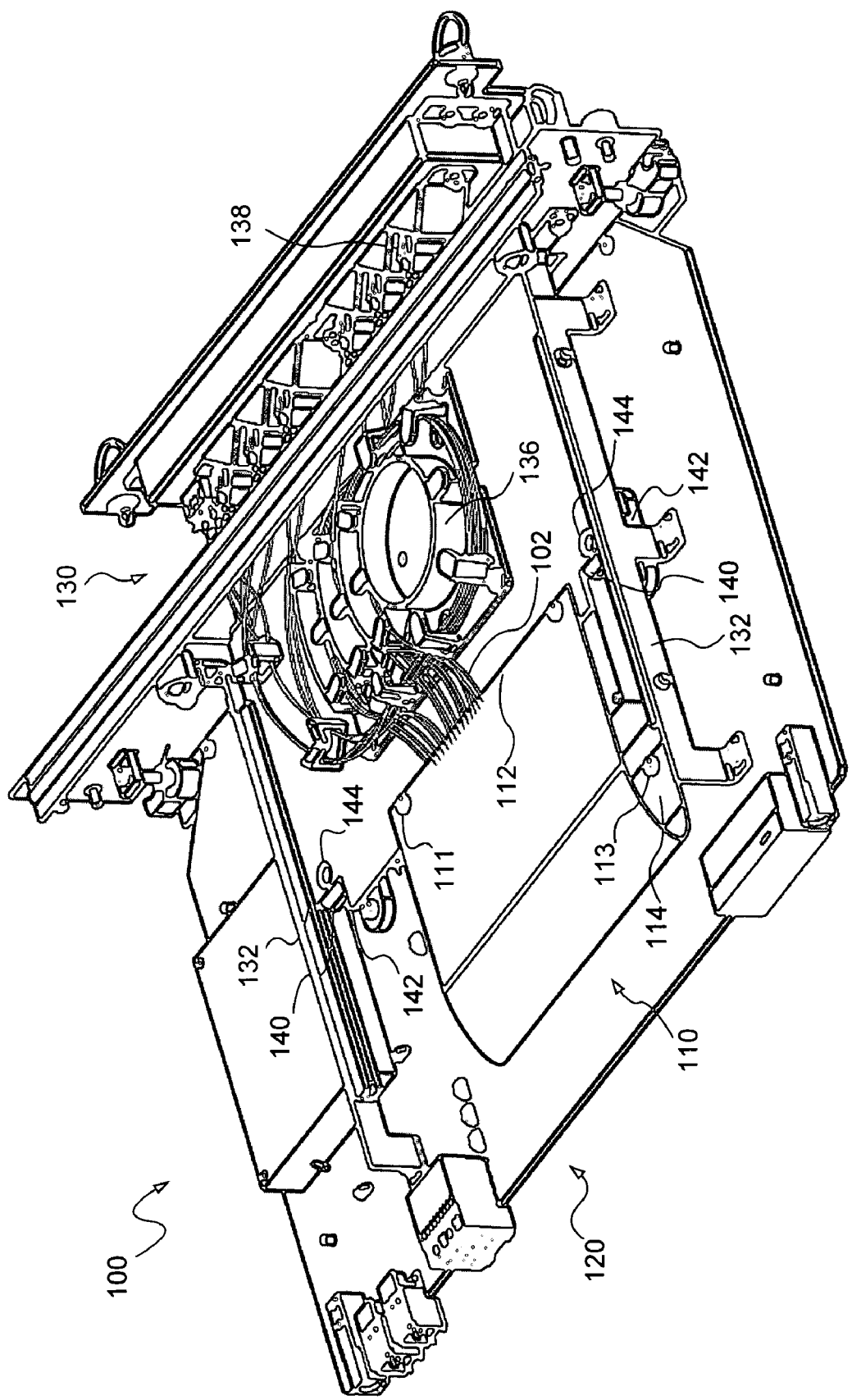

According to one embodiment of a movable optical fiber connection system 100, FIGS. 1A and 1B, the optical fiber connecting structures include first and second circuit boards 120, 130 that are movable relative to each other. Optical fibers 102 may be coupled to the circuit boards 120, 130 in the system 100 such that the optical fibers 102 move with the relative movement of the circuit boards 120, 130. The term "coupled" as used herein may refer to mechanical coupling, optical coupling or both and does not necessarily require a direct coupling or connection. Components that are coupled may be separated by intermediate components or devices.

At least a portion of the optical fibers 102 are secured in an optical fiber bend limiting device 110. The optical fiber bend limiting device 110 may be coupled at each of the ends 112, 114 to the respective circuit boards 120, 130, for example, using threaded fasteners such as screws 111, 113. The optical fiber bend limiting device 110 thus transitions the fibers 102 from one level on the first circuit board 120 to another level on the second circuit board 130.

The first circuit board 120 may be a fixed mother board and the second circuit board 130 may be an optical interconnection board that is capable of being partially removed. The second circuit board 130 may be mounted, for example, as a mezzanine card that is parallel to the first circuit board 120 and slidable along carriers 132. The optical fibers 102 may be optically coupled to components (not shown) on the first circuit board 120 and to connectors 138 on the second circuit board 130. The second circuit board 130 may also include a fiber storage tray 136 for mechanically coupling the fibers 102 by receiving and organizing coils of the optical fibers 102 on the second circuit board 130. In other embodiments, the optical fibers 102 may only be mechanically coupled to one or both of the circuit boards 120, 130 and optically coupled to components that are not located on the circuit boards 120, 130. One example of a moveable optical connection system 100 is an optical switching system, although the bend limiting device 110 may be used in any system with optical fibers 102 that move with structures in the system.

When the fiber bend limiting device 110 is coupled between the boards 120, 130 in this embodiment, the fiber bend limiting device 110 is bent and folder over. The fiber bend limiting device 110 thus transitions the fibers 102 by routing the fibers 102 in a first direction along the first circuit board 120, around the bend to the higher level circuit board 130, and along a second direction on the second circuit board 130. In the retracted position of the optical fiber connection system 100 shown in FIG. 1A, the optical fiber bend limiting device 110 has sufficient slack to enable the second circuit board 130 to move to the extended position shown in FIG. 1B. When the second circuit board 130 is moved between these positions, the fiber bend limiting device 110 maintains the optical fibers 102 in the desired position and with an acceptable bend radius.

The optical fiber connection system 100 may also include one or more stop mechanisms to prevent the circuit boards 120, 130 (or other movable connecting structures) from moving beyond a certain point, thereby preventing damage to the optical fibers 102. In the illustrated embodiment, for example, a tab 140 may extend from each side of the circuit board 130 and a stop 142 may be mounted to each side of the circuit board 120 and/or to the carriers 132. In the extended position shown in FIG. 1B, the tabs 140 may contact the stops 142 to prevent the circuit board 130 from sliding further. In the illustrated embodiment, a spring loaded mechanism 144, such as a spring loaded ball plunger, may also be used on each side of the second circuit board 130 to engage a corresponding hole or recess in each of the carriers 132 when the second circuit board 130 is in the extended position. Any other stop mechanism or combination of stop mechanisms capable of impeding movement may also be used to prevent the circuit boards or other movable fiber connecting structures from moving beyond a certain point.

In this embodiment, therefore, the circuit board 130 may be partially removed to allow the user to clean the connectors 138. The circuit board 130 may also be partially removed to facilitate the repair, upgrade or removal of components while the circuit pack continues to be operational because the optical fibers 102 remain coupled.

Although the exemplary embodiment shows an optical fiber bend limiting device used with circuit boards that move parallel, the optical fiber bend limiting device may be used with any type of movable structures coupled to the fibers and moving in different directions. The connecting structures may include, for example, pluggable modules or components coupled to the optical fibers. The optical fiber bend limiting device may also be coupled between fiber connecting structures that move orthogonally or that pivot relative to each other. Although a single optical fiber bend limiting device is shown in the illustrated embodiment, a system may include multiple bend limiting devices transitioning optical fibers between different structures and locations.

Figure 2A:
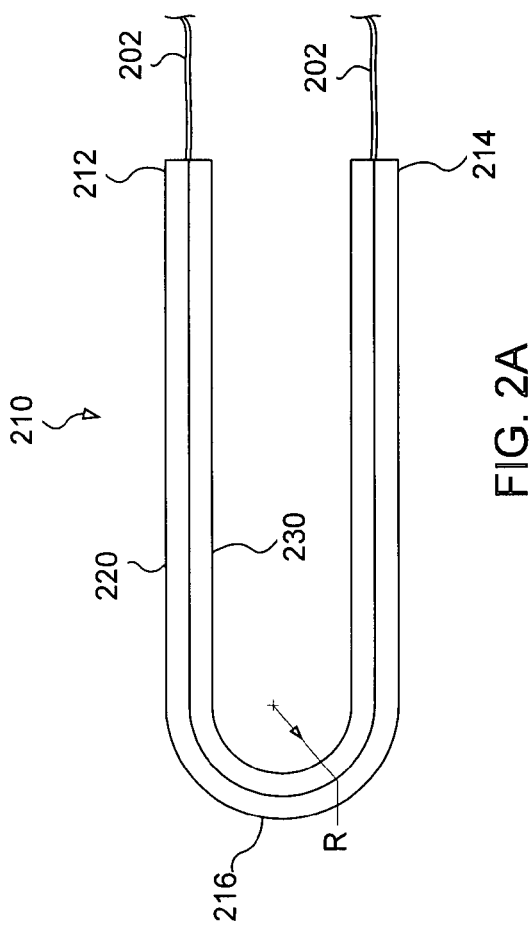
FIGS. 2A and 2B are side views of an optical fiber bend limiting device in first and second positions.
Figure 2B:
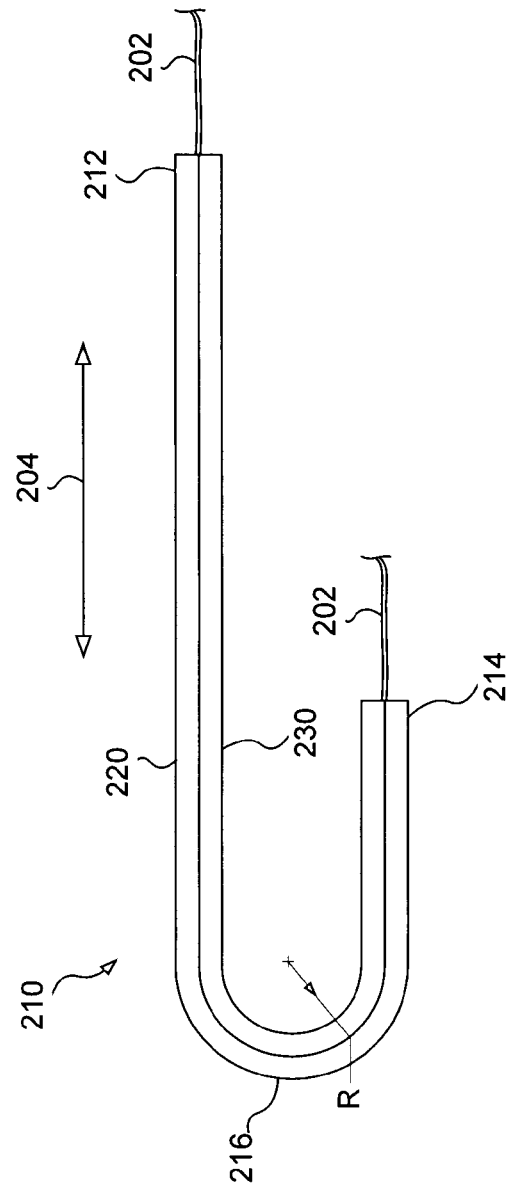

FIGS. 2A and 2B show an embodiment of an optical fiber bend limiting device 210 by itself in first and second positions. The optical fiber bend limiting device 210 may include first and second side portions 220, 230 with one or more optical fibers 202 sandwiched in between and extending from the ends 212, 214 of the bend limiting device 210. When secured in an optical fiber connection system according to one embodiment (e.g., as shown in FIGS. 1A and 1B), the fiber bend limiting device 210 is bent or folded over to form a U-shaped bend portion 216. The optical fiber bend limiting device 210 thus allows the ends 212, 214 to move relative to each other, for example, along the direction of arrow 204.

The fiber bend limiting device 210 may be designed to allow this movement while resisting bending to a point where the bend radius R falls below a bend radius limit for the optical fiber(s) 202. The bend radius limit is the extent to which the optical fiber(s) 202 may bend without damaging the fibers and/or adversely affecting optical transmission through the fibers. The bend radius limit may depend on the type of optical fibers and the wavelengths being carried on the fibers. In one example where the wavelengths are generally in a range of about 1310 to 1550 nm, the bend radius limit of the optical fibers may be about 1 inch.

Figure 3:
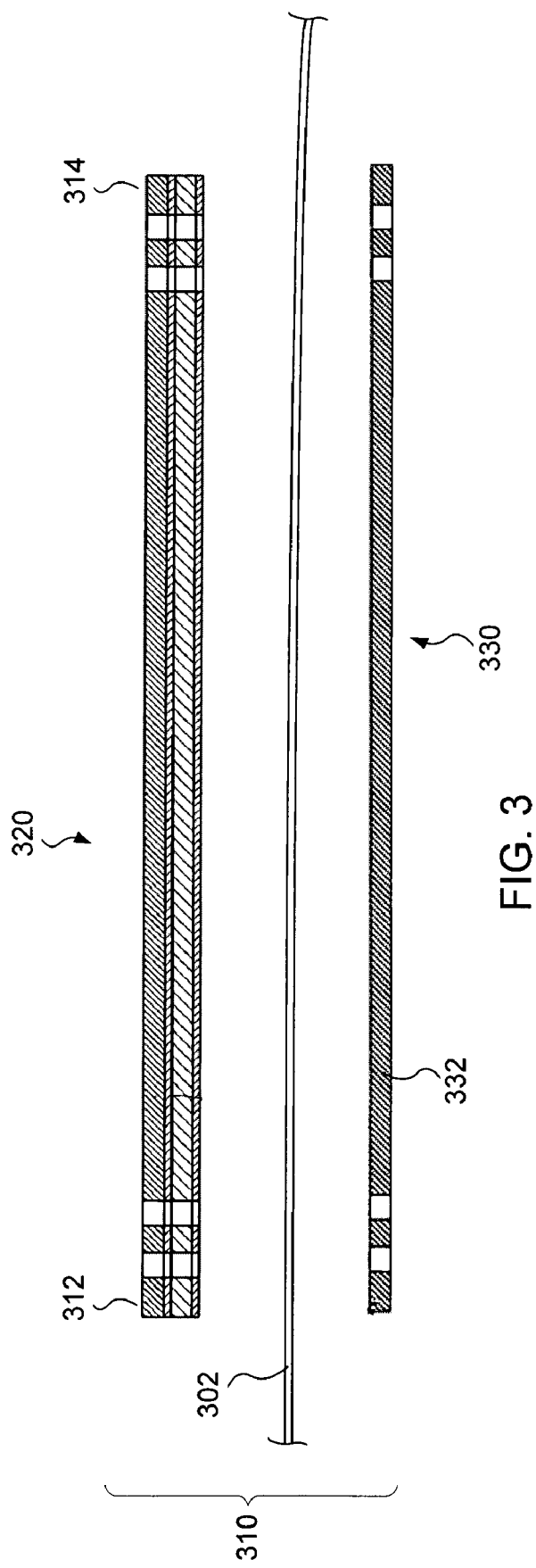
FIG. 3 is an exploded view of one embodiment of the optical fiber bend limiting device.
Figure 4:
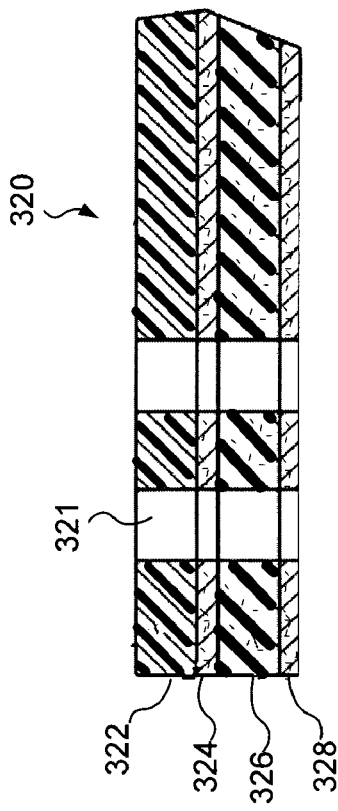
FIG. 4 is a partial cross-sectional view of one side portion of the optical fiber bend limiting device shown in FIG. 3.
Figure 5:
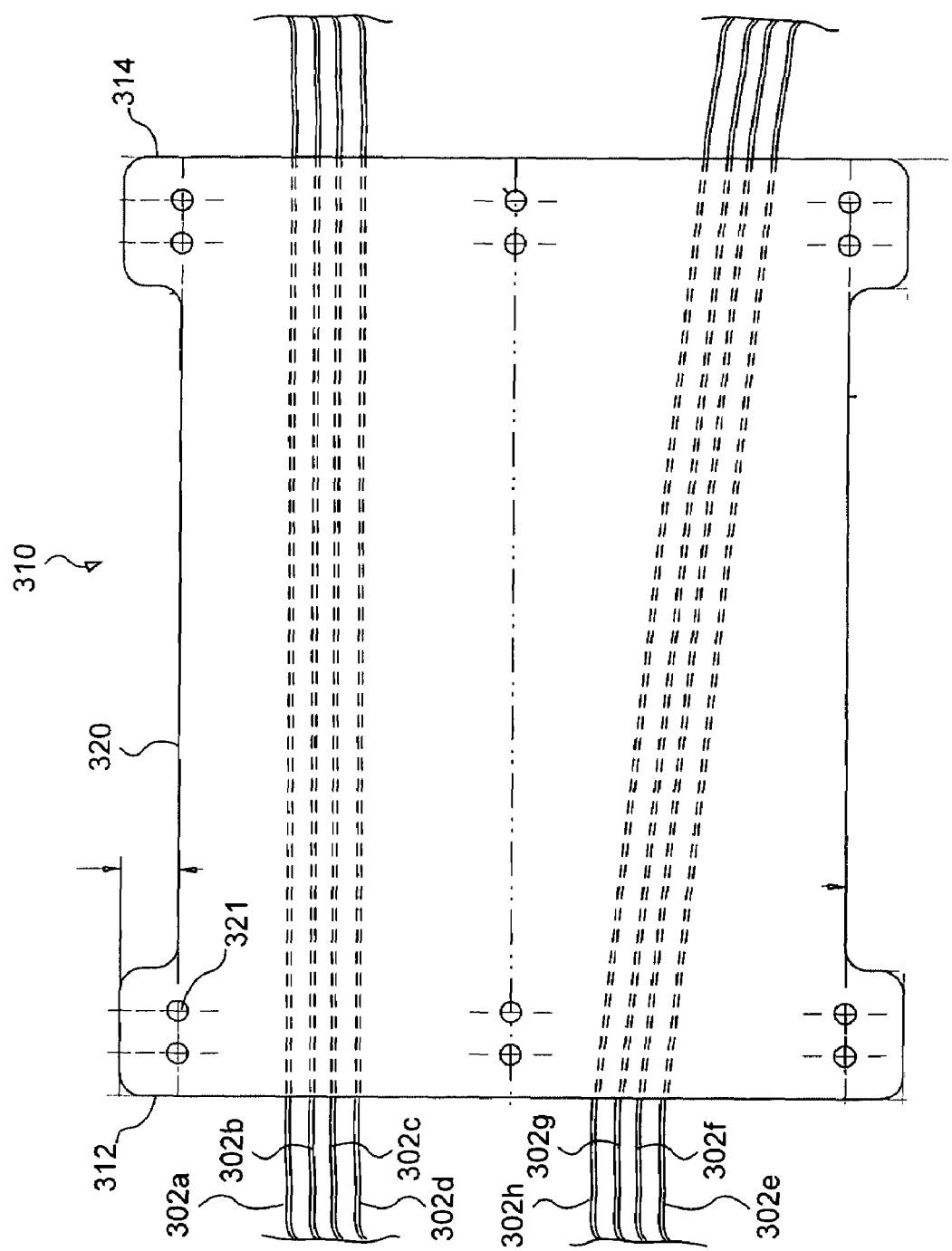
FIG. 5 is a top view of the optical fiber bend limiting device shown in FIG. 3.

Referring to FIGS. 3-5, one embodiment of an optical fiber bend limiting device 310 includes a composite construction. The composite construction may include one or more layers selected to protect the optical fibers during movement and to resist bending beyond the bend radius limit. The optical fiber bend liming device 310, according to the illustrated embodiment, includes a first side portion 320 with the composite structure and a second side portion 330 (or cover portion) with a single layer. Each of the ends 312, 314 of the first and second side portions 320, 330 may include one or more apertures 321 configured to receive fasteners that couple the optical fiber bend limiting device 310 to the circuit boards or other connecting structures.

According to the illustrated embodiment shown in greater detail in FIG. 4, the composite structure of the first side portion 320 includes a plastic layer 322, a first adhesive layer 324, a foam layer 326 and a second adhesive layer 328 and the second side portion 330 includes a foam layer 332. The first adhesive layer 324 adheres the foam layer 326 to the plastic layer 322 and the second adhesive layer 328 adheres the foam layer 332 of the second side portion 330 to the foam layer 326 of the first side portion 320. The adhesive layers 324, 328 may include adhesive along the entire surfaces of the plastic and/or foam layers or adhesive in selected locations sufficient to secure the plastic and/or foam layers. The plastic layer 322 may be a 0.005 in. clear plastic film such as the type known as MELINEX clear film. The first and second adhesive layers 324 and 328 may be an acrylic adhesive such as the type known as 9495 MP 3M adhesive. The foam layers 326, 332 may be cellular urethanes such as the type known as PORON. Other types of plastic, foam and adhesive materials may also be used.

By securing the optical fiber(s) 302 between the foam layers 326, 332, the optical fibers are protected. In use, the optical fiber bend limiting device 310 may be secured such that the foam layers 326, 332 are on the inside when the bend limiting device 310 is bent. The foam layers 326, 332 thus compress when the bend limiting device 310 is bent allowing the bend limiting device 310 to bend without bending beyond the bend radius limit.

As shown in FIG. 5, the ends 312, 314 of the optical fiber bend limiting device 310 may include tabs extending outward to facilitate coupling the bend limiting device 310 to the circuit boards or other connecting structures. Although the first and second side portions 320, 330 have the same general shape and dimensions in the illustrated embodiment, the second side portion 330 may have a different shape or dimension than the first side portion 320 as long as the second side portion 330 adequately protects the optical fibers 302.

The position of the optical fibers 302 in the optical fiber bend limiting device 310 may depend on where the fibers 302 are being routed in the connection system. As shown in FIG. 5, for example, some fibers 302a-302d may run generally straight through the bend limiting device 310 and other fibers 302e-302h may be angled within the bend limiting device 310 to direct the fibers to a different location. Optical fibers may also pass through the optical fiber bend limiting device 310 along a non-linear path.

In use, the desired number of fibers 302 may be secured between the side portions 320, 330 with the desired orientation. The number and orientation of the fibers may depend upon the components and configuration within the optical system in which the bend limiting device 310 is used. When the fibers 302 are secured between the side portions 320, 330, the ends 312, 314 of the bend limiting device 310 may be secured to the respective circuit boards or other connecting structures. The optical fibers may then be coupled to the components, for example, using connectors or splicing.

Figure 6:
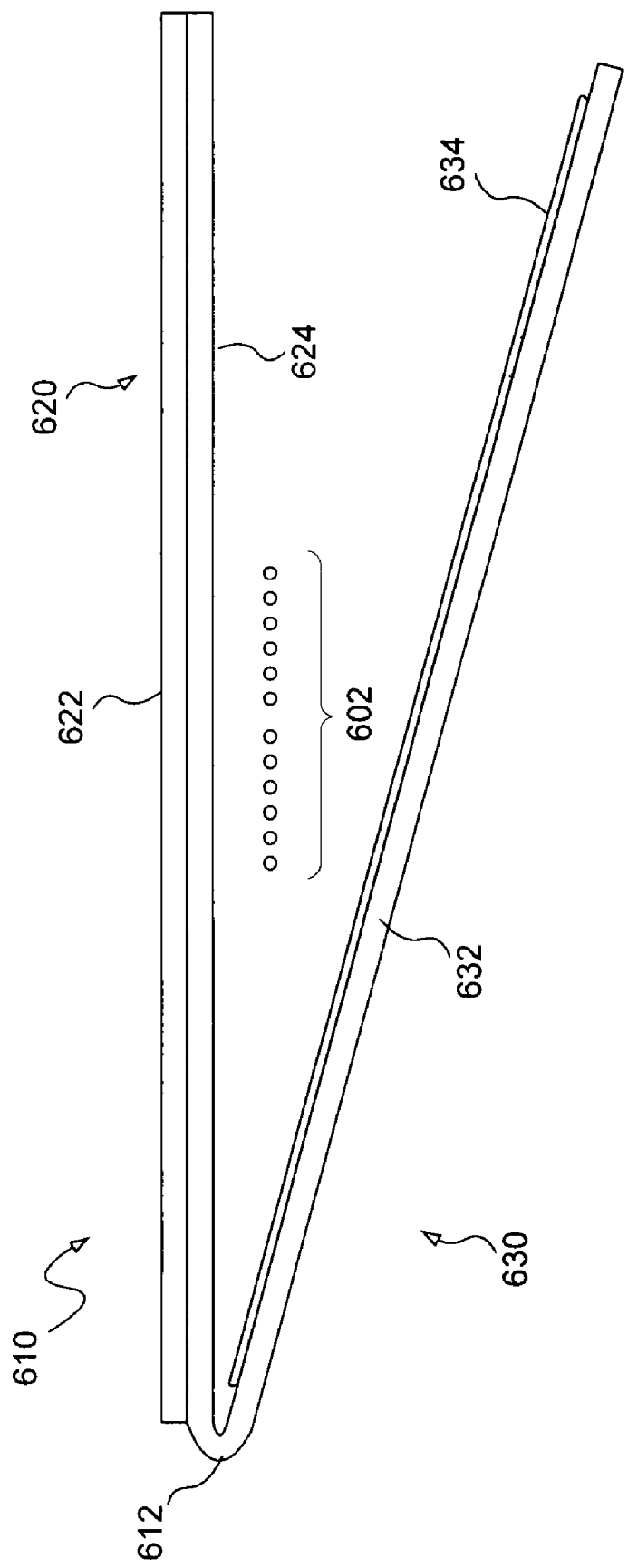
FIG. 6 is a side view of another embodiment of the optical fiber bend limiting device.

FIG. 6 shows another embodiment of an optical fiber bend limiting device 610 that may be used to transition optical fibers 602. According to this embodiment, the optical fiber bend limiting device 610 includes first and second side portions 620, 630 with the second side portion 630 being one-piece with one of the layers of the first side portion 620. For example, the first side portion 620 may include a plastic layer 622 and a foam layer 624 adhered or otherwise secured to the plastic layer. The second side portion 630 may include a foam layer 632 that is one-piece with the foam layer 624 of the first side portion 620. The foam layers 624, 632 may be folded along a fold 612 with the fibers 602 between the foam layers 624, 632. An adhesive layer 634 may be applied to the foam layer 624 and/or foam layer 632 to adhere the foam layers together with the fibers 602 located therebetween.

Accordingly, an optical fiber bend limiting device, according to embodiments described herein, transitions optical fibers, allows the optical fibers to move, and protects the optical fibers. Consistent with an embodiment, an optical fiber bend limiting device transitions optical fibers between connecting structures that move relative to each other. The optical fiber bend limiting device includes a first side portion, a second side portion secured to the first side portion, and at least one optical fiber located between the first and second side portions. The optical fiber has a bend radius limit, and the first and second side portions are configured to bend together with the fiber while resisting bending beyond the bend radius limit of the optical fiber.

Consistent with another embodiment, an optical fiber bend limiting device assembly includes a first side portion including a plastic layer and a foam layer and a second side portion including a foam layer configured to be adhered to the first side portion with at least one optical fiber passing between therebetween. The first and second side portions are configured to sandwich the at least one optical fiber and are configured to bend together with the fiber while resisting bending beyond the bend radius limit of the optical fiber.

Consistent with a further embodiment, a movable optical fiber connection system includes a first fiber connecting structure, a second fiber connecting structure movable relative to the first fiber connecting structure, and optical fibers coupled to the first and second fiber connecting structures. The system also includes an optical fiber bend limiting device including at least first and second side portions secured together with the optical fibers positioned therebetween. The optical fiber bend limiting device is coupled between the first and second fiber connecting structures with a bend in the optical fiber bend limiting device that allows the first and second fiber connecting structures to move relative to each other. The optical fiber bend limiting device is also configured to resist bending beyond a bend radius limit of the optical fibers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A movable optical fiber connection system comprising:
   a first fiber connecting structure;
   a second fiber connecting structure movable relative to the first fiber connecting structure;
   optical fibers coupled to the first and second fiber connecting structures, the optical fibers having a bend radius limit; and
   an optical fiber bend limiting device including at least first and second side portions secured together with at least a portion of the optical fibers positioned therebetween, the optical fiber bend limiting device including first and second ends that are movable relative to each other such that the optical fiber bend limiting device bends along at least a portion thereof, wherein the optical fiber bend limiting device is coupled between the first and second fiber connecting structures with a bend in the optical fiber bend limiting device that allows the first and second fiber connecting structures to move relative to each other, and wherein the optical fiber bend limiting device is configured to resist bending beyond the bend radius limit of the optical fibers.

2. The movable optical fiber connection system of claim 1 wherein the first and second fiber connecting structures include first and second circuit boards mounted such that the circuit boards are movable relative to each other, and wherein a first end of the optical fiber bend limiting device is mounted to the first circuit board and a second end of the optical fiber bend limiting device is mounted to the second circuit board.

3. The movable optical fiber connection system of claim 2 wherein the second circuit board is mounted substantially parallel to the first circuit board and is configured to move in a direction substantially parallel to the first circuit board.

4. The movable optical fiber connection system of claim 1 further including at least one stop mechanism mounted to at least one of the fiber connecting structures to limit relative movement of the fiber connecting structures.

5. The movable optical fiber connection system of claim 1 wherein the optical fiber bend limiting device is bent to form a generally U-shaped portion.

6. The movable optical fiber connection system of claim 1 wherein the first and second side portions include at least one plastic layer and at least one foam layer.

7. The movable optical fiber connection system of claim 1 wherein the first side portion includes a composite structure, and wherein the composite structure includes at least a plastic layer and a foam layer.

8. The movable optical fiber connection system of claim 7 wherein the optical fiber bend limiting device is bent to form a generally U-shaped portion, and wherein the foam layer is located on the inside of the U-shaped portion.

9. The movable optical fiber connection system of claim 7 wherein the composite structure further includes at least one adhesive layer between the plastic layer and the foam layer.

10. A movable optical fiber connection system comprising:
    a first fiber connecting structure;
    a second fiber connecting structure movable relative to the first fiber connecting structure;
    optical fibers coupled to the first and second fiber connecting structures, the optical fibers having a bend radius limit; and
    an optical fiber bend limiting device including at least first and second side portions secured together with at least a portion of the optical fibers positioned therebetween, wherein the optical fiber bend limiting device is coupled between the first and second fiber connecting structures with a bend in the optical fiber bend limiting device that allows the first and second fiber connecting structures to move relative to each other, and wherein the optical fiber bend limiting device is configured to resist bending beyond the bend radius limit of the optical fibers, wherein the optical fiber bend limiting device is bent to form a generally U-shaped portion.

* * * * *